United States Patent
Seymour

(10) Patent No.: US 7,244,771 B1
(45) Date of Patent: Jul. 17, 2007

(54) COMMERCIAL PRODUCTION OF SYNTHETIC FUEL FROM FERMENTATION BY-PRODUCTS SYSTEM

(76) Inventor: Gary F. Seymour, 717 10th Ave. NW., Grand Rapids, MN (US) 55744

( * ) Notice: Subject to any disclaimer, the term of this patent is extended or adjusted under 35 U.S.C. 154(b) by 0 days.

(21) Appl. No.: 11/556,006

(22) Filed: Nov. 2, 2006

Related U.S. Application Data

(63) Continuation-in-part of application No. 11/464,086, filed on Aug. 11, 2006.

(51) Int. Cl.
C07C 27/00 (2006.01)
C25C 1/10 (2006.01)
C10L 5/00 (2006.01)

(52) U.S. Cl. .................. 518/700; 205/629; 44/451; 44/605

(58) Field of Classification Search ............ 518/700; 44/451, 605; 205/629
See application file for complete search history.

(56) References Cited

U.S. PATENT DOCUMENTS

| | | | |
|---|---|---|---|
| 4,427,584 A | 1/1984 | LeGrand et al. | |
| 4,463,105 A | 7/1984 | Ichikawa et al. | |
| 4,506,033 A | 3/1985 | Ichikawa | |
| 5,416,245 A | * 5/1995 | MacGregor et al. | ........ 568/697 |
| 5,527,449 A | 6/1996 | Brown et al. | |
| 5,578,090 A | 11/1996 | Bradin | |
| 5,691,268 A | 11/1997 | Koveal et al. | |
| 5,703,133 A | 12/1997 | Vanderspurt et al. | |
| 5,906,664 A | 5/1999 | Basu et al. | |
| 5,952,235 A | 9/1999 | Bearer | |
| 6,080,211 A | 6/2000 | Mathur | |
| 6,248,230 B1 | 6/2001 | Min et al. | |
| 6,306,184 B2 | 10/2001 | Ahmed | |
| 6,371,998 B1 | 4/2002 | Mathur | |
| 6,818,027 B2 | 11/2004 | Murcia | |
| 6,824,682 B2 | 11/2004 | Branson | |
| 6,858,048 B1 | 2/2005 | Jimeson et al. | |
| 6,968,693 B2 | 11/2005 | Colibaba-Evulet et al. | |
| 2003/0097783 A1 | 5/2003 | Jordan | |
| 2004/0118034 A1 | 6/2004 | Williamson | |
| 2005/0044778 A1 | 3/2005 | Orr | |
| 2005/0113467 A1 | 5/2005 | Branson | |
| 2005/0142250 A1 | 6/2005 | Garwood | |
| 2005/0160662 A1 | 7/2005 | Jordan | |

(Continued)

FOREIGN PATENT DOCUMENTS

JP 60081136 5/1985

(Continued)

Primary Examiner—J. Parsa

(57) ABSTRACT

A commercial production of synthetic fuel from fermentation by-products system for efficiently producing synthetic fuels and other usable by-products. The major volatile by product of most fermentation processes is carbon dioxide. The commercial production of synthetic fuel from fermentation by-products system generally includes commercial production of synthetic fuel from fermentation by-products system for producing synthetic fuels and other usable by-products. The composition includes providing wind and/or solar generated energy to a electrolysis unit, providing water to the electrolysis unit, separating the water within the electrolysis unit into hydrogen gas and oxygen gas, supplying the hydrogen gas and the oxygen gas to a turbine, sending the hydrogen gas, heated carbon monoxide and carbon dioxide to a Fischer-Tropsch reactor, producing ethanol and methanol within the Fischer-Tropsch reactor and collecting the mixture of ethanol and methanol.

20 Claims, 3 Drawing Sheets

U.S. PATENT DOCUMENTS

2005/0268539 A1  12/2005  Schwab et al.
2006/0014841 A1   1/2006  Melnichuk et al.
2006/0021277 A1   2/2006  Petersen et al.
2006/0042158 A1   3/2006  Lee

FOREIGN PATENT DOCUMENTS

JP  60104024  6/1985
JP  61227542  10/1986

* cited by examiner

COMMERCIAL PRODUCTION OF SYNTHETIC FUEL FROM FERMENTATION BY-PRODUCTS SYSTEM

CROSS REFERENCE TO RELATED APPLICATIONS

I hereby claim benefit under Title 35, United States Code, Section 120 of U.S. patent application Ser. No. 11/464,086 filed Aug. 11, 2006. This application is a continuation IN-PART of the 11/464,086 filed on Aug. 11, 2006 application. The 11/464,086 application is currently pending. The 11/464,086 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to commercial fuel production and more specifically it relates to a commercial production of synthetic fuel from fermentation by-products system for efficiently producing synthetic fuels and other usable by-products.

2. Description of the Related Art

Any discussion of the prior art throughout the specification should in no way be considered as an admission that such prior art is widely known or forms part of common general knowledge in the field.

Commercial fuel production systems have been in use for years. Typically, other systems provide synthesis for waste materials such as plants to be converted into useful gases for energy. Additionally, previous systems have provided for conversion of products such as corn or other useful items into liquid fuels. However, these previous systems did not show the conversion of what are generally considered waste products to be converted into useful products including but not limited to synthetic fuels, fertilizer, and useful gases with little or no emissions being produced from that system. Additionally, the present invention uses renewable power sources as an energy source as opposed to the non-renewable energy sources often used in previous systems.

While these compositions may be suitable for the particular purpose to which they address, they are not as suitable for producing synthetic fuels and other usable by-products. However, these previous systems did not show the conversion of what are generally considered waste products to be converted into useful products including but not limited to synthetic fuels, fertilizer, and useful gases with little or no emissions being produced from that system.

BRIEF SUMMARY OF THE INVENTION

The general purpose of the present invention is to provide a commercial production of synthetic fuel from fermentation by-products system that has many of the advantages of the commercial fuel production mentioned heretofore. The invention generally relates to a commercial fuel production which includes which commercial production of synthetic fuel from fermentation by-products system for producing synthetic fuels and other usable by-products. The composition includes providing wind and/or solar generated energy to a electrolysis unit, providing water to the electrolysis unit, cleaving the water within the electrolysis unit into hydrogen gas and oxygen gas, supplying the hydrogen gas and the oxygen gas to a turbine, sending the hydrogen gas, heated carbon dioxide and carbon monoxide to a Fischer-Tropsch reactor, producing ethanol and methanol within the Fischer-Tropsch reactor and collecting the mixture of ethanol and methanol.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a commercial production of synthetic fuel from fermentation by-products system (i.e. Carbon Dioxide) for efficiently producing synthetic fuels and other usable by-products.

Another object is to provide a commercial production of synthetic fuel that produces little or no pollutants.

Another object is to provide a commercial production of synthetic fuel from fermentation by-products system (i.e. Carbon Dioxide) that uses renewable energy to create an environmentally friendly system.

An additional object is to provide a commercial production of synthetic fuel that provides an incentive for ethanol and methanol production.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
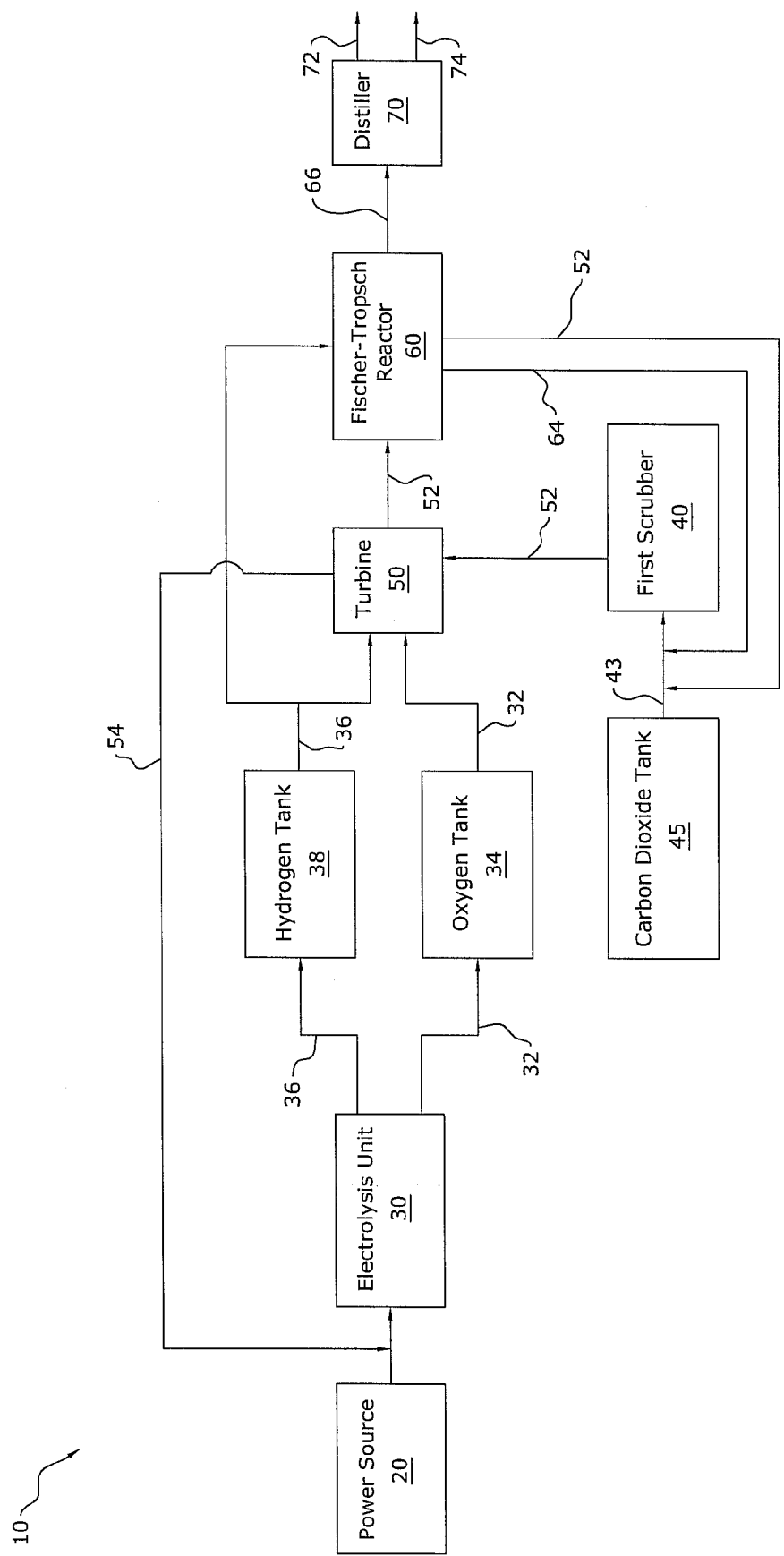
FIG. 1 is a flow diagram of the process of the present invention.
Figure 2:
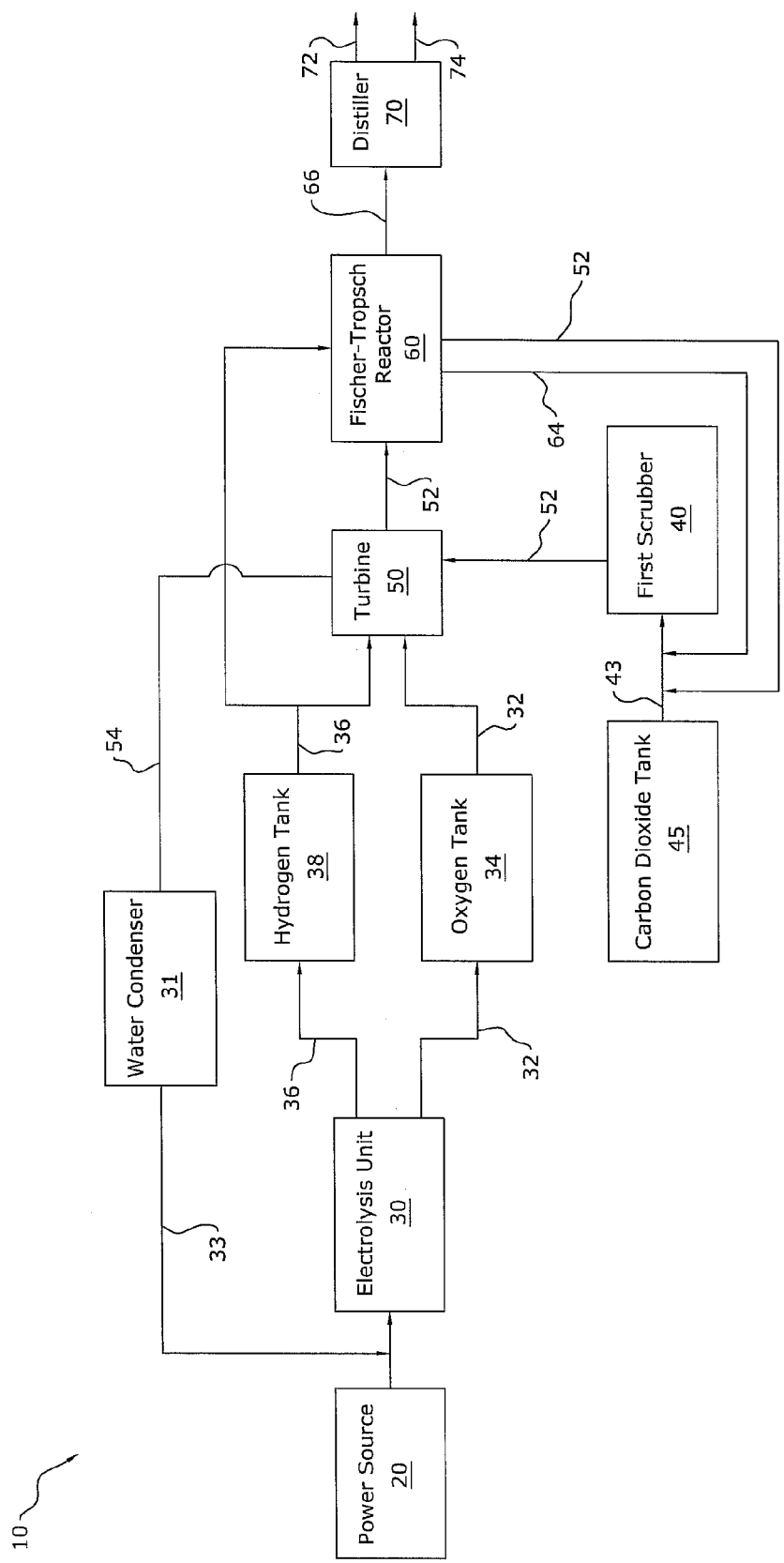
FIG. 2 is a flow diagram of the process of the present invention including a water condenser.
Figure 3:
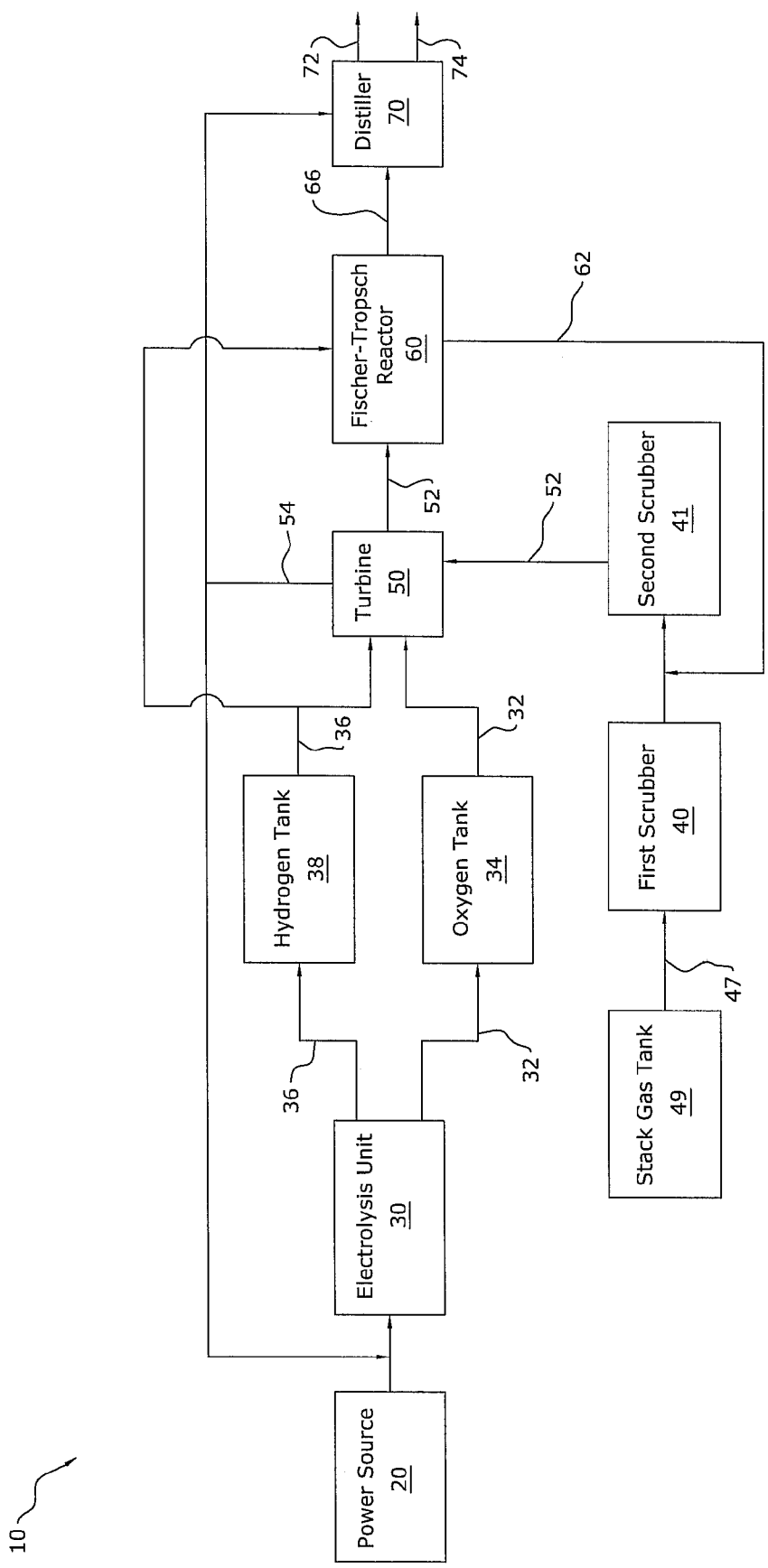
FIG. 3 is a flow diagram of the process of an alternative embodiment of the present invention.

Turning now descriptively to the drawings, in which similar reference characters denote similar elements throughout the several views, FIGS. 1 through 3 illustrate a commercial production of synthetic fuel from fermentation by-products system 10, which comprises commercial production of synthetic fuel from fermentation by-products system 10 for producing synthetic fuels and other usable by-products. The composition includes providing wind and/or solar generated energy to a electrolysis unit 30, providing water to the electrolysis unit 30, cleaving the water within the electrolysis unit 30 into hydrogen gas and oxygen gas, supplying the hydrogen gas and the oxygen gas to a turbine 50, separating hydrogen, heating carbon monoxide, and carbon dioxide in the turbine 50 and sending to the Fischer-Tropsch reactor 60, producing ethanol and methanol within the Fischer-Tropsch reactor 60 and collecting the mixture of ethanol and methanol produced.

B. Power Source

The commercial production of synthetic fuel from fermentation by-products system 10 includes an initial power source 20 to drive the processes occurring therein as shown in FIGS. 1 through 3. The power source 20 is preferably comprised of a power source in which fossil fuels are not utilized, such as but not limited to wind generated power or solar power. It is appreciated that as an alternate embodiment the power source 20 may also be comprised of a power plant or electric power source. It is further appreciated that two or three power sources 20 may be utilized in conjuncture with the commercial production of synthetic fuel from fermentation by-products system 10. The power source 20 is preferably electrically connected to the electrolysis unit 30, wherein the power source 20 powers the electrolysis unit 30.

C. Electrolysis Unit

The electrolysis unit 30 is comprised of a water electrolysis unit 30 configuration. The electrolysis unit 30 preferably receives a water source to perform an electrolysis process. The electrolysis unit 30 splits the water molecules within the water electrolysis unit 30 into hydrogen gas and oxygen gas. The water may be supplied to the water electrolysis unit 30 from water or steam produced in the turbine 50, the hydrogen turbine 50 or any other place that water or steam accumulates within the commercial production of synthetic fuel from fermentation by-products system 10. In the case of utilizing the steam from the turbine 50, the steam from the turbine 50 is preferably passed through a water condenser 31. Water is then transferred to the electrolysis unit 30 via a water stream 33.

The hydrogen gas from the electrolysis unit 30 is released from the electrolysis unit 30 via a first hydrogen stream 36. The first hydrogen stream 36 is preferably connected to a hydrogen tank 38, wherein the hydrogen gas from the electrolysis unit 30 may be stored in the hydrogen tank 38. The hydrogen gas is then preferably delivered via a second hydrogen stream 36 to the turbine 50 for production of heat as shown in FIGS. 1 through 3, wherein the second hydrogen stream 36 is connected to the turbine 50. A third hydrogen stream 36 also preferably delivers the hydrogen gas to the Fischer-Tropsch reactor 60. It is appreciated that the hydrogen gas from the electrolysis unit 30 may be directly delivered to the turbine 50 or/and the Fischer-Tropsch reactor 60 rather than utilizing the hydrogen tank 38.

The oxygen gas from the electrolysis unit 30 is released from the electrolysis unit 30 via a first oxygen stream 32. The first oxygen stream 32 is preferably connected to an oxygen tank 34, wherein the oxygen gas from the electrolysis unit 30 may be stored in the oxygen tank 34. The oxygen gas is then preferably delivered via a second oxygen stream 32 to the turbine 50 for production of heat as shown in FIGS. 1 through 3, wherein the second oxygen stream 32 is connected to the turbine 50. It is appreciated that the oxygen gas from the electrolysis unit 30 may be directly delivered to the turbine 50 rather than utilizing the oxygen tank 34.

D. Scrubbers

In the preferred embodiment the first scrubber 40 is preferably comprised of a sulfur scrubber configuration. The first scrubber 40 preferably receives a carbon dioxide gas. The carbon dioxide gas is delivered to the first scrubber 40 via a carbon dioxide stream 43 from a carbon dioxide tank 45 as shown in FIG. 1. The first scrubber 40 also preferably receives a heat stream 64 from the Fischer-Tropsch reactor 60. The first scrubber 40 further preferably receives unreacted CO—CO2 gas via a CO—CO2 stream 52 (Carbon Monoxide/Carbon Dioxide) via the Fischer-Tropsch reactor 60 as shown in FIGS. 1 and 2.

The first scrubber 40 preferably removes any volatile sulfur compounds within the carbon dioxide gas/ CO—CO2 gas. The removal of the volatile sulfur compounds in the carbon dioxide is crucial in that if not removed the sulfur will poison the catalyst in the Fischer-Tropsch reactor 60. Also the sulfur may cause pollution problems upon combustion if the sulfur is present in the ethanol and the methanol. The carbon dioxide stream 43, CO—CO2 stream 52 and heat stream 64 are further all preferably connected to the first scrubber 40.

In the alternative embodiment of the commercial production of synthetic fuel from fermentation by-products system 10 a stack gas is preferably substituted for the carbon dioxide gas. The stack gases preferably form from combustion of hydrocarbons, wood and biomass. The alternative embodiment includes a first scrubber 40 preferably comprised of a mercury and particulate scrubber. The first scrubber 40 of the alternative embodiment preferably receives a stack gas via a stack gas stream 47 from a stack gas tank 49. The mercury/other particulate matter is removed from the stack gas because in internal combustion engines mercury and particulates are harmful to the environment and personal health.

The alternative embodiment also preferably includes a second scrubber 41. The second scrubber 41 is preferably connected to the first scrubber 40 as shown in FIG. 3. The second scrubber 41 is preferably comprised of a sulfur and nitrous oxide scrubber. Any volatile sulfur compounds or nitrous oxide is preferably removed or neutralized from the stack gas. The alternative embodiment also preferably receives a heat stream 64 from the Fischer-Tropsch reactor 60 between the first scrubber 40 and the second scrubber 41. The heat stream 64 from the Fischer-Tropsch reactor 60 preferably aids the turbine 50 in heating the gases. The alternative embodiment further preferably receives unreacted CO—CO2 gas via a CO—CO2 stream 52 (Carbon Monoxide/Carbon Dioxide) via the Fischer-Tropsch reactor 60 also between the first scrubber 40 and the second scrubber 41.

E. Turbine

The turbine 50 is comprised of a hydrogen turbine 50. The turbine 50 is also preferably comprised of a "Tube Style" turbine 50. The turbine 50 is further preferably utilized to supply heat by burning hydrogen and oxygen gas. The turbine 50 is used to dissociate the CO2 to CO (Carbon Dioxide-Carbon Monoxide). The CO—CO2 gas is preferably delivered and fluidly connected via a CO—CO2 stream 52 to the Fischer-Tropsch reactor 60 as shown in FIGS. 1 through 3. The turbine 50 is powered by the oxygen gas and the hydrogen gas produced by the electrolysis unit 30 as shown in FIGS. 1 through 3. Any excess water molecules and/or steam that are formed in the turbine 50 may be supplied back to the electrolysis unit 30 via a steam stream 54 as shown in FIG. 2. The process of providing excess water molecules to the electrolysis unit 30 acts as a renewable source of electrolysis water for the commercial production of synthetic fuel from fermentation by-products system 10.

The supply of the steam via the steam stream 54 to the electrolysis unit 30 preferably allows the commercial production of synthetic fuel from fermentation by-products system 10 to continually run with a limited outside water source provided to the electrolysis unit 30. The steam preferably passes through a water condenser 31 and then returns to the electrolysis unit 30 in water form. It is appreciated that the steam from the turbine 50 may also be utilized in other processes and applications.

The turbine 50 heats the carbon dioxide gas via the hydrogen gas and oxygen gas to approximately 1540 degrees Centigrade, wherein the carbon dioxide gas is able to dissociate to carbon monoxide gas, wherein it is known in the art that carbon monoxide gas and carbon dioxide gas are by-products of fermentation to make alcohols. The carbon monoxide gas can then react with hydrogen in the Fischer-Tropsch reactor 60 to produce a mixture of ethanol and methanol.

In the alternative embodiment of the present invention the turbine 50 also preferably supplies the distiller 70 with a steam via a steam stream 54 as shown in FIG. 3. The steam preferably aids the distiller 70 in separating the methanol gas from the ethanol gas.

F. Fischer-Tropsch Reactor

The Fischer-Tropsch reactor 60 is used to convert the hydrogen gas provided by the hydrogen stream 36, carbon monoxide and carbon dioxide provided by the CO—CO2 stream 52 into a mixture of methanol and ethanol using Fischer-Tropsch reactors 60 and Fischer-Tropsch processes generally used in the art. It is also well known in the art that one mole of sugar gives two moles of ethanol and two moles of carbon dioxide, wherein sugar, starch or fiber is preferably a source of fermentation.

The Fischer-Tropsch reactor 60 causes the hydrogen gas, carbon monoxide gas and carbon dioxide gas to form methanol and ethanol by a synthesis of passing the hydrogen, carbon monoxide, and carbon dioxide gas over a catalyst, which may include but is not limited to iron or cobalt. The Fischer-Tropsch reactor 60 is an exothermic process, giving off large amounts of heat that is used to aid the hydrogen turbine in the conversion of carbon monoxide, carbon dioxide and hydrogen gases to a mixture of ethanol and methanol. The Fischer-Tropsch reactor 60 also generates a sufficient amount of heat to dissociate some carbon dioxide gas remaining in the CO—CO2 stream 52 to carbon monoxide gas. The mixture of methanol and ethanol produced by the Fischer-Tropsch reactor 60 can be separated from one another via distillation if necessary.

G. Distiller

The distiller 70 is preferably connected to the Fischer-Tropsch reactor 60 via the ethanol-methanol stream 66 as shown in FIGS. 1 through 3. The distiller 70 is preferably comprised of a common distiller capable of separating ethanol from methanol. Once the ethanol and methanol are separated within the distiller 70 the ethanol and the methanol may be separately delivered from the distiller 70 via an ethanol stream 72 and a methanol stream 74. The separated methanol and ethanol have many useful applications, such as but not limited to additives or blends with gasoline and feedstocks used to manufacture biodiesel. It is appreciated that the distiller 70 may be omitted from the commercial production of synthetic fuel from fermentation by-products system 10 if the methanol and ethanol are not desired to be separated, for use in areas such as but not limited to production of biodiesel.

H. Process of Invention

In use, energy is provided from a power source 20 preferably in the form of solar power or wind generated power. The energy from the power source 20 is applied to water in an electrolysis unit 30, thereby separating the hydrogen and oxygen and passing the hydrogen gas into a hydrogen tank 38 via a first hydrogen stream 36 and the oxygen gas into an oxygen tank 34 via a second oxygen stream 32 as shown in FIGS. 1 and 2.

The hydrogen and oxygen gases are then provided, via a second hydrogen stream 36 and a second oxygen stream 32 respectively, to the tube style turbine 50, which produces a significant amount of heat. Any excess steam from the turbine 50 may be diverted back to the electrolysis unit 30 as shown in FIGS. 1 through 3. Carbon dioxide gas is also preferably fed into the turbine 50 from a carbon dioxide tank 45 via the carbon dioxide stream 43 as shown in FIGS. 1 and 2. The carbon dioxide gas is cleansed of any volatile sulfur compounds within the first scrubber 40 preferably before entering the turbine 50.

The hydrogen, carbon monoxide and carbon dioxide gases are then transferred via a first CO—CO2 stream 52 to the Fischer Tropsch reactor as shown in FIGS. 1 and 2. The Fischer-Tropsch reactor 60 takes the hydrogen, carbon monoxide and carbon dioxide gases and converts them to a mixture of ethanol and methanol.

Any excess unreacted carbon monoxide gas and carbon dioxide gas left in the Fischer-Tropsch reactor 60 are supplied to the carbon dioxide stream 43 via the second CO—CO2 stream 52 and the heat stream 64. The unreacted carbon monoxide gas and carbon dioxide gas is further supplied to the carbon dioxide stream 43 prior to the first scrubber 40 as shown in FIGS. 1 and 2. The second CO—CO2 stream 52, heat stream 64 and carbon dioxide stream 43 are then passed through the first scrubber 40 and subsequently to the tube style turbine 50. The mixture of ethanol and methanol produced in the Fischer-Tropsch reactor 60 are then preferably extracted from the Fischer-Tropsch reactor 60 via a first methanol-ethanol stream 72 and into the distiller 70 as shown in FIGS. 1 and 2. The methanol-ethanol is then separated within the distiller 70 to produce separate methanol and ethanol.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A commercial production of synthetic fuel from fermentation by-products system, comprising:
   providing a power source to an electrolysis unit;
   providing a water source to said electrolysis unit;
   separating said water source within said electrolysis unit into a hydrogen gas and an oxygen gas;
   supplying said hydrogen gas to a Fischer-Tropsch reactor;
   supplying said hydrogen gas, said oxygen gas and a carbon dioxide gas to a hydrogen turbine;
   producing a carbon monoxide gas within said hydrogen turbine;
   supplying said carbon monoxide gas and said carbon dioxide gas into said Fischer-Tropsch reactor via said hydrogen turbine;
   producing a mixture of ethanol and methanol within said Fischer-Tropsch reactor; and
   collecting said mixture of ethanol and methanol produced by said Fischer-Tropsch reactor.

2. The commercial production of synthetic fuel from fermentation by-products system of claim 1, including a first scrubber to remove or neutralize a pollutant from said carbon dioxide gas and/or said carbon monoxide gas.

3. The commercial production of synthetic fuel from fermentation by-products system of claim 2, wherein said pollutant is comprised of volatile sulfur compounds.

4. The commercial production of synthetic fuel from fermentation by-products system of claim 2, wherein said first scrubber is positioned before said hydrogen turbine in a flow of said carbon dioxide gas.

5. The commercial production of synthetic fuel from fermentation by-products system of claim 1, wherein said carbon monoxide gas and said carbon dioxide gas supplied to said Fischer-Tropsch reactor is at a temperature of between 10 and 2000 degrees Centigrade.

6. The commercial production of synthetic fuel from fermentation by-products system of claim 1, including a water condenser to convert steam from said hydrogen turbine into a second water source.

7. The commercial production of synthetic fuel from fermentation by-products system of claim 1, wherein an unreacted carbon dioxide gas from said Fischer-Tropsch reactor is fed to said hydrogen turbine.

8. The commercial production of synthetic fuel from fermentation by-products system of claim 1, including a distiller to separate said mixture of ethanol and methanol produced by said Fischer-Tropsch reactor.

9. The commercial production of synthetic fuel from fermentation by-products system of claim 1, wherein said power source is comprised of a wind power source.

10. The commercial production of synthetic fuel from fermentation by-products system of claim 1, wherein said power source is comprised of a solar power source.

11. A commercial production of synthetic fuel from fermentation by-products system, comprising:
    providing a power source to an electrolysis unit;
    providing a water source to said electrolysis unit;
    separating said water source within said electrolysis unit into a hydrogen gas and an oxygen gas;
    supplying said hydrogen gas to a Fischer-Tropsch reactor;
    supplying said hydrogen gas and said oxygen gas to a hydrogen turbine;
    supplying a carbon dioxide gas;
    removing or neutralizing a pollutant within said carbon dioxide gas via a first scrubber;
    supplying a substantially pollutant free carbon dioxide gas to said hydrogen turbine;
    producing a carbon monoxide gas within said hydrogen turbine;
    supplying said carbon monoxide gas and said carbon dioxide gas into said Fischer-Tropsch reactor via said hydrogen turbine;
    producing a mixture of ethanol and methanol within said Fischer-Tropsch reactor; and
    collecting said mixture of ethanol and methanol produced by said Fischer-Tropsch reactor.

12. The commercial production of synthetic fuel from fermentation by-products system of claim 11, wherein said pollutant is comprised of volatile sulfur compounds.

13. The commercial production of synthetic fuel from fermentation by-products system of claim 11, including a water condenser to convert steam from said hydrogen turbine into a second water source.

14. The commercial production of synthetic fuel from fermentation by-products system of claim 11, wherein an unreacted carbon dioxide gas and an unreacted carbon monoxide gas from said Fischer-Tropsch reactor are fed to said hydrogen turbine.

15. The commercial production of synthetic fuel from fermentation by-products system of claim 11, including a distiller to separate said mixture of ethanol and methanol produced by said Fischer-Tropsch reactor.

16. The commercial production of synthetic fuel from fermentation by-products system of claim 11, wherein said carbon monoxide gas and said carbon dioxide gas supplied to said Fischer-Tropsch reactor is at a temperature of between 10 and 2000 degrees Centigrade.

17. The commercial production of synthetic fuel from fermentation by-products system of claim 11, wherein said power source is comprised of a wind power source.

18. The commercial production of synthetic fuel from fermentation by-products system of claim 11, wherein said power source is comprised of a solar power source.

19. A commercial production of synthetic fuel from fermentation by-products system, comprising:
    providing a power source to an electrolysis unit;
    providing a water source to said electrolysis unit;
    separating said water source within said electrolysis unit into a hydrogen gas and an oxygen gas;
    supplying said hydrogen gas to a Fischer-Tropsch reactor;
    supplying said hydrogen gas and said oxygen gas to a hydrogen turbine;
    supplying a carbon dioxide gas;
    removing or neutralizing a pollutant within said carbon dioxide gas via a first scrubber;
    supplying a substantially pollutant free carbon dioxide gas to said hydrogen turbine;
    producing a carbon monoxide gas within said hydrogen turbine;
    supplying said carbon monoxide gas and said carbon dioxide gas into a Fischer-Tropsch reactor via said hydrogen turbine;
    producing a mixture of ethanol and methanol within said Fischer-Tropsch reactor;
    collecting said mixture of ethanol and methanol produced by said Fischer-Tropsch reactor;
    providing a water condenser to convert steam from said hydrogen turbine into a second water source;
    supplying said second water source is fed to said electrolysis unit; and supplying an unreacted carbon dioxide gas and an unreacted carbon monoxide gas from said Fischer-Tropsch reactor to said hydrogen turbine.

20. The commercial production of synthetic fuel from fermentation by-products system of claim 19, including a distiller to separate said mixture of ethanol and methanol produced by said Fischer-Tropsch reactor.

* * * * *